US009092021B2

(12) United States Patent
Wong et al.

(10) Patent No.: US 9,092,021 B2
(45) Date of Patent: Jul. 28, 2015

(54) INTERACTIVE APPARATUS (71) Applicants: Tit Shing Wong, Kowloon (CN); Wai Choi Lewie Leung, Kowloon (CN); Kwok Yau Cheung, New Territories (CN)

(72) Inventors: Tit Shing Wong, Kowloon (CN); Wai Choi Lewie Leung, Kowloon (CN); Kwok Yau Cheung, New Territories (CN)

(73) Assignee: J. T. Labs Limited, Fanling, New Territories (CN)

( * ) Notice: Subject to any disclaimer, the term of this patent is extended or adjusted under 35 U.S.C. 154(b) by 270 days.

(21) Appl. No.: 13/735,695

(22) Filed: Jan. 7, 2013

(65) Prior Publication Data
US 2013/0178981 A1 Jul. 11, 2013

Related U.S. Application Data (60) Provisional application No. 61/583,971, filed on Jan. 6, 2012.

(51) Int. Cl.
G05B 19/18 (2006.01)
G05B 19/04 (2006.01)
G06F 3/0362 (2013.01)

(52) U.S. Cl.
CPC ............. *G05B 19/04* (2013.01); *G06F 3/0362* (2013.01)

(58) Field of Classification Search
CPC combination set(s) only.
See application file for complete search history.

(56) References Cited

U.S. PATENT DOCUMENTS

| 4,621,562 | A  | * | 11/1986 | Carr et al. ................... 89/41.05 |
| 5,323,867 | A  | * | 6/1994  | Griffin et al. ................ 180/22 |
| 5,443,354 | A  | * | 8/1995  | Stone et al. ................. 414/729 |
| 6,347,261 | B1 | * | 2/2002  | Sakaue et al. ............... 700/245 |
| 6,662,889 | B2 | * | 12/2003 | De Fazio et al. .............. 180/22 |
| 7,113,848 | B2 | * | 9/2006  | Hanson ....................... 700/245 |
| 7,843,431 | B2 | * | 11/2010 | Robbins et al. .............. 345/161 |
| 7,949,437 | B2 | * | 5/2011  | Wong et al. .................... 701/1 |
| 8,007,340 | B2 | * | 8/2011  | Sip ............................. 446/392 |
| 8,442,661 | B1 | * | 5/2013  | Blackwell et al. ............ 700/54 |
| 8,758,191 | B2 | * | 6/2014  | Takenaka et al. ............. 476/68 |
| 8,788,096 | B1 | * | 7/2014  | Sokol et al. ................. 700/259 |
| 2001/0037163 | A1 | * | 11/2001 | Allard ......................... 700/245 |
| 2003/0216834 | A1 | * | 11/2003 | Allard ......................... 700/245 |
| 2003/0220796 | A1 | * | 11/2003 | Aoyama et al. .............. 704/275 |
| 2004/0182614 | A1 | * | 9/2004  | Wakui ......................... 180/7.1 |
| 2004/0249510 | A1 | * | 12/2004 | Hanson ....................... 700/245 |
| 2006/0293787 | A1 | * | 12/2006 | Kanda et al. ................. 700/245 |
| 2007/0128979 | A1 | * | 6/2007  | Shackelford et al. ......... 446/484 |
| 2007/0192910 | A1 | * | 8/2007  | Vu et al. ....................... 901/17 |
| 2009/0055019 | A1 | * | 2/2009  | Stiehl et al. ................. 700/249 |
| 2011/0144804 | A1 | * | 6/2011  | Song et al. .................. 700/246 |
| 2011/0177753 | A1 | * | 7/2011  | Irmler et al. ................. 446/392 |
| 2012/0001846 | A1 | * | 1/2012  | Taniguchi et al. ............ 345/156 |
| 2012/0022688 | A1 | * | 1/2012  | Wong et al. .................. 700/253 |
| 2012/0209433 | A1 | * | 8/2012  | Paz Rodriguez ............. 700/259 |

* cited by examiner

*Primary Examiner* — Jonathan L Sample
(74) *Attorney, Agent, or Firm* — Erickson Kernell Derusseau & Kleypas, LLC (57) ABSTRACT A robotic apparatus that interacts with a user and a personal computer (PC) receives inputs from a user and from the PC and reacts and interacts. The interactive apparatus includes a USB interface with the PC to receive power and data such as key strokes, key combinations, email notifications, and web cam events, for example. The interactive apparatus also includes microphones and a phototransistor to detect sounds and movement. The interactive apparatus includes an eye assembly attached to a body and leg, which is responsive to inputs and interactions with the user and PC.

4 Claims, 11 Drawing Sheets

INTERACTIVE APPARATUS

CROSS REFERENCE TO RELATED APPLICATION

This application claims the benefit of application Ser. No. 61/583,971, filed Jan. 6, 2012, entitled INTERACTIVE APPARATUS.

The present invention relates to an interactive personal robotic apparatus and, more particularly, to an interactive robotic apparatus interfaced with a personal computer.

BACKGROUND

Various personal robots are well known. Personal robots that display pre-determined movements are also known. Conventional personal robots are typically battery powered and move in predictable ways, and do not positively interact with the user or exhibit a personality. This limits their use and utility.

SUMMARY

The present invention provides a robotic apparatus that interacts with a user and a personal computer (PC). The interactive apparatus receives inputs from the user and from the PC and reacts and interacts. The interactive apparatus includes a USB interface with the PC to receive power and data such as key strokes, key combinations, email notifications, and web cam events, for example. The interactive apparatus also includes microphones and a phototransistor to detect sounds and movement. The interactive apparatus includes an eye assembly attached to a body and leg, which is responsive to inputs and interactions with the user and PC.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Referring to the figures, an interactive apparatus of the present invention is generally indicated by reference numeral 20. The interactive apparatus 20 includes a base assembly 22, a foot assembly 24, which may be circular as shown, a leg 26, a knee 28, a body assembly 30, an eye assembly 32 and an eyelid 34. The eye assembly 32 is rotationally coupled to the body assembly 30, which may be pivotably coupled to the leg assembly 26 at the knee 28 thereby permitting movements about a rotational axis 29. The leg assembly 26 is pivotably coupled to the foot assembly 24 for rotation about a rotational axis 31.

Figure 1:
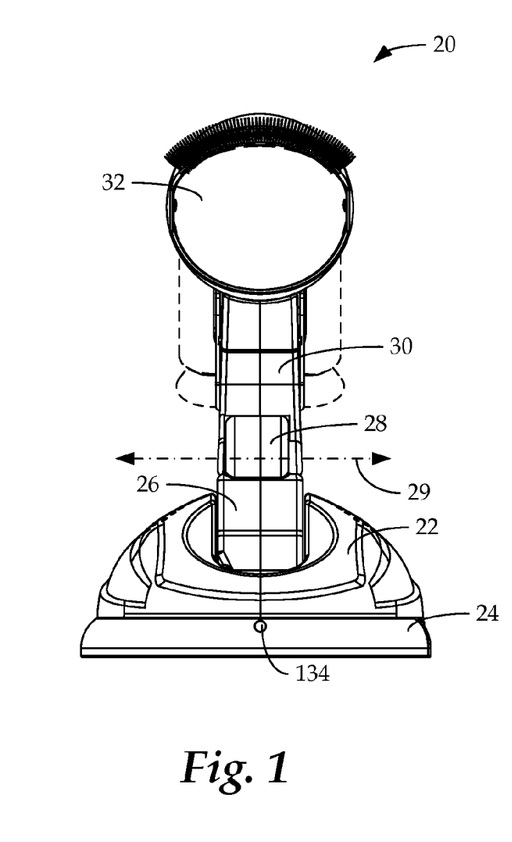
FIG. 1 is a front elevational view of an interactive apparatus of the present invention.
Figure 2:
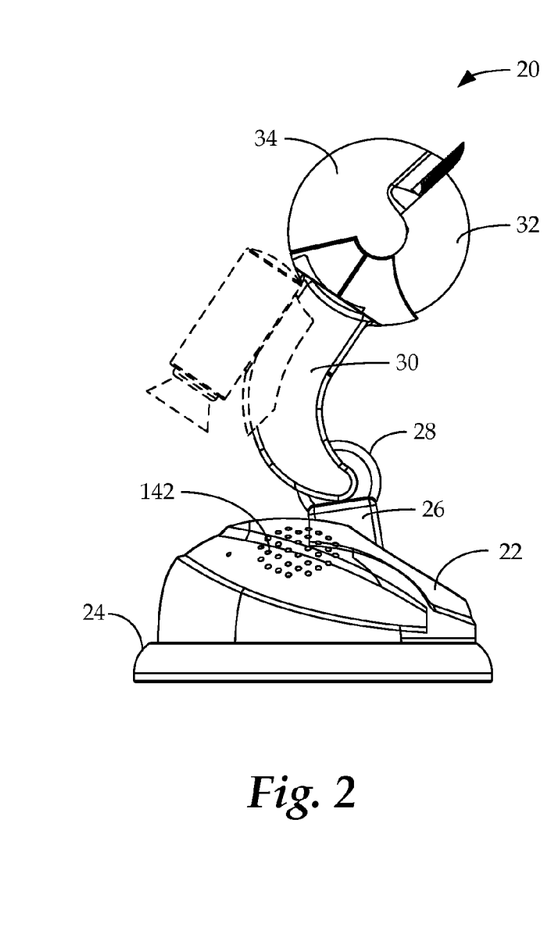
FIG. 2 is a right side view of the interactive apparatus of FIG. 1.
Figure 3:
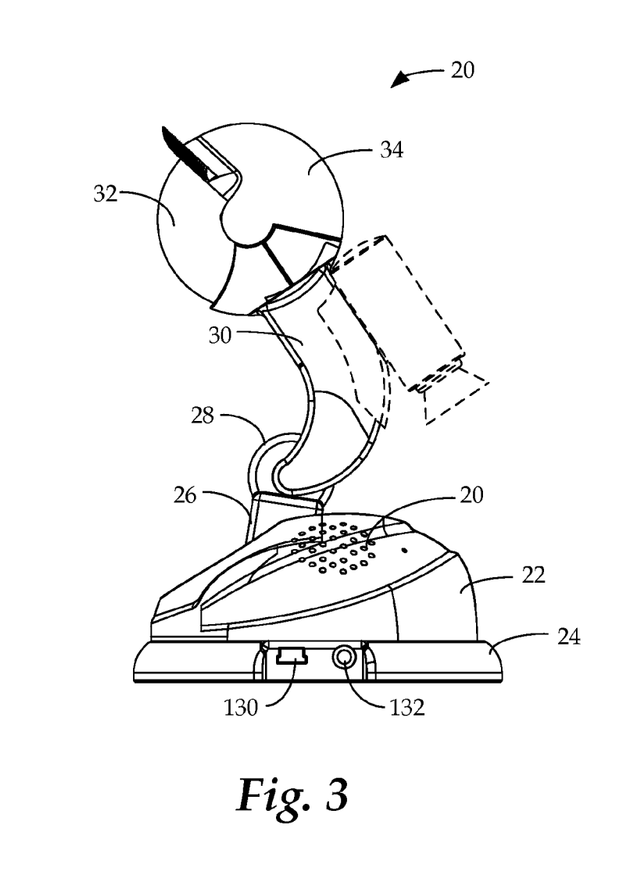
FIG. 3 is a left side view of the interactive apparatus of FIG. 1.
Figure 4:
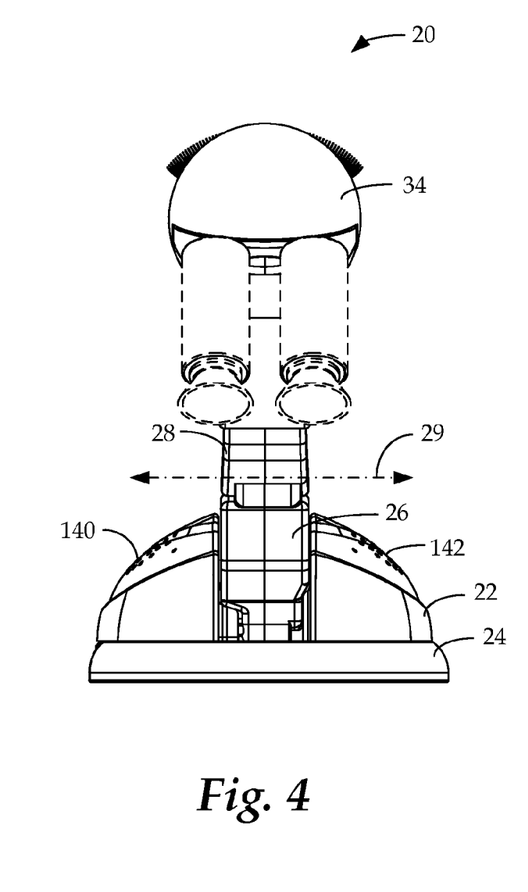
FIG. 4 is a back view of the interactive apparatus of FIG. 1.
Figure 5:
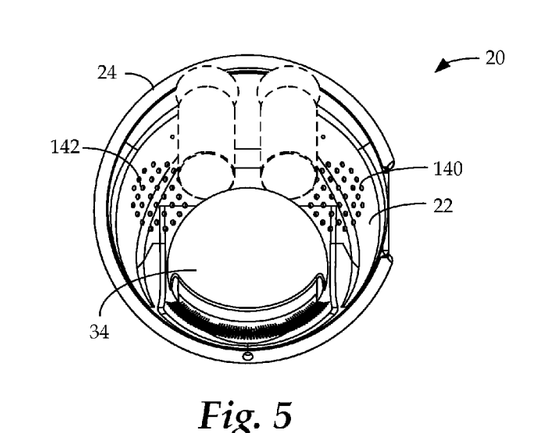
FIG. 5 is a top view of the interactive apparatus of FIG. 1.
Figure 6:
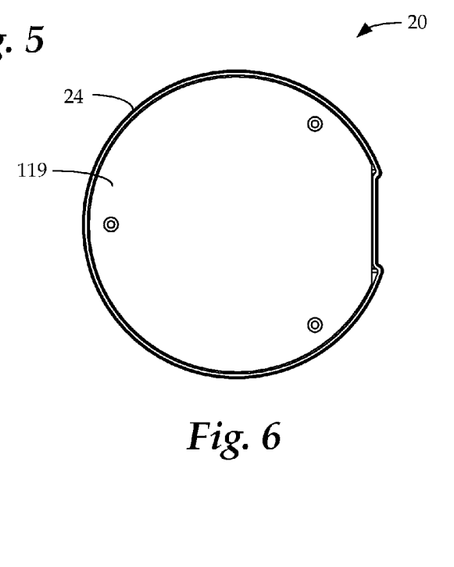
FIG. 6 is a bottom view of the interactive apparatus of FIG. 1.
Figure 7:
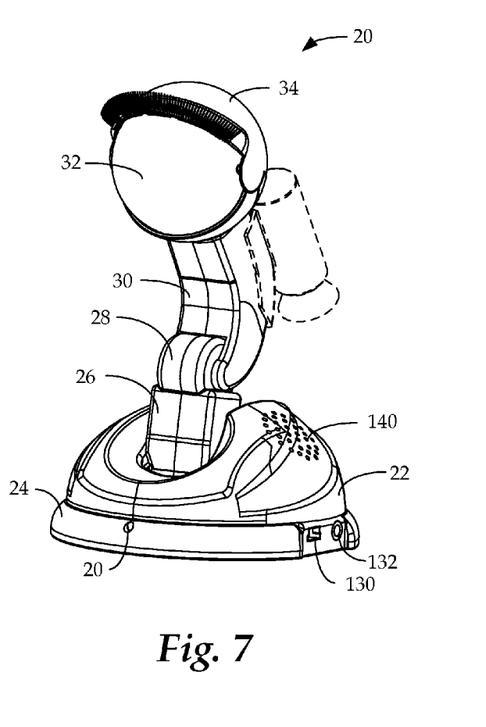
FIG. 7 is a perspective view of the interactive apparatus of FIG. 1.
Figure 8:
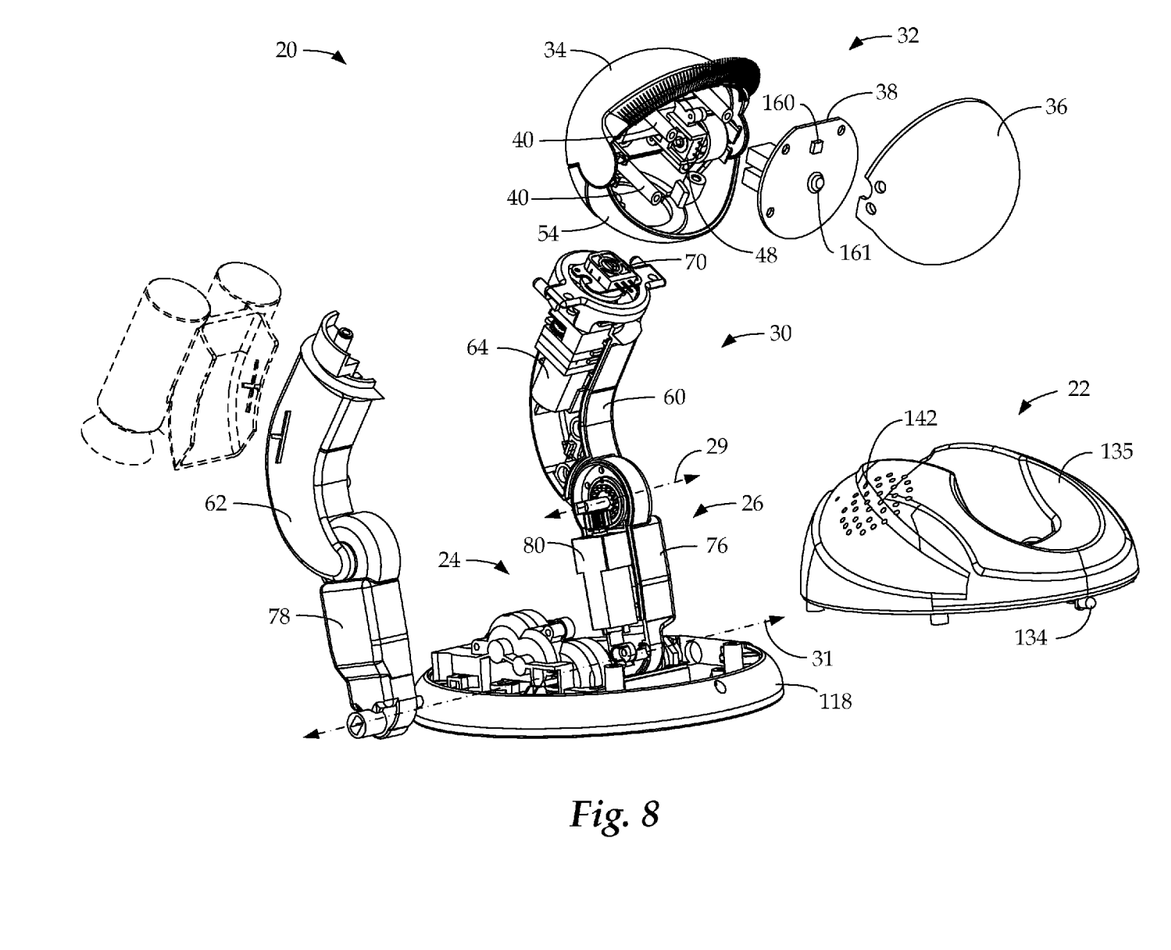
FIG. 8 is a partial exploded perspective view of the interactive apparatus of FIG. 1.
Figure 9:
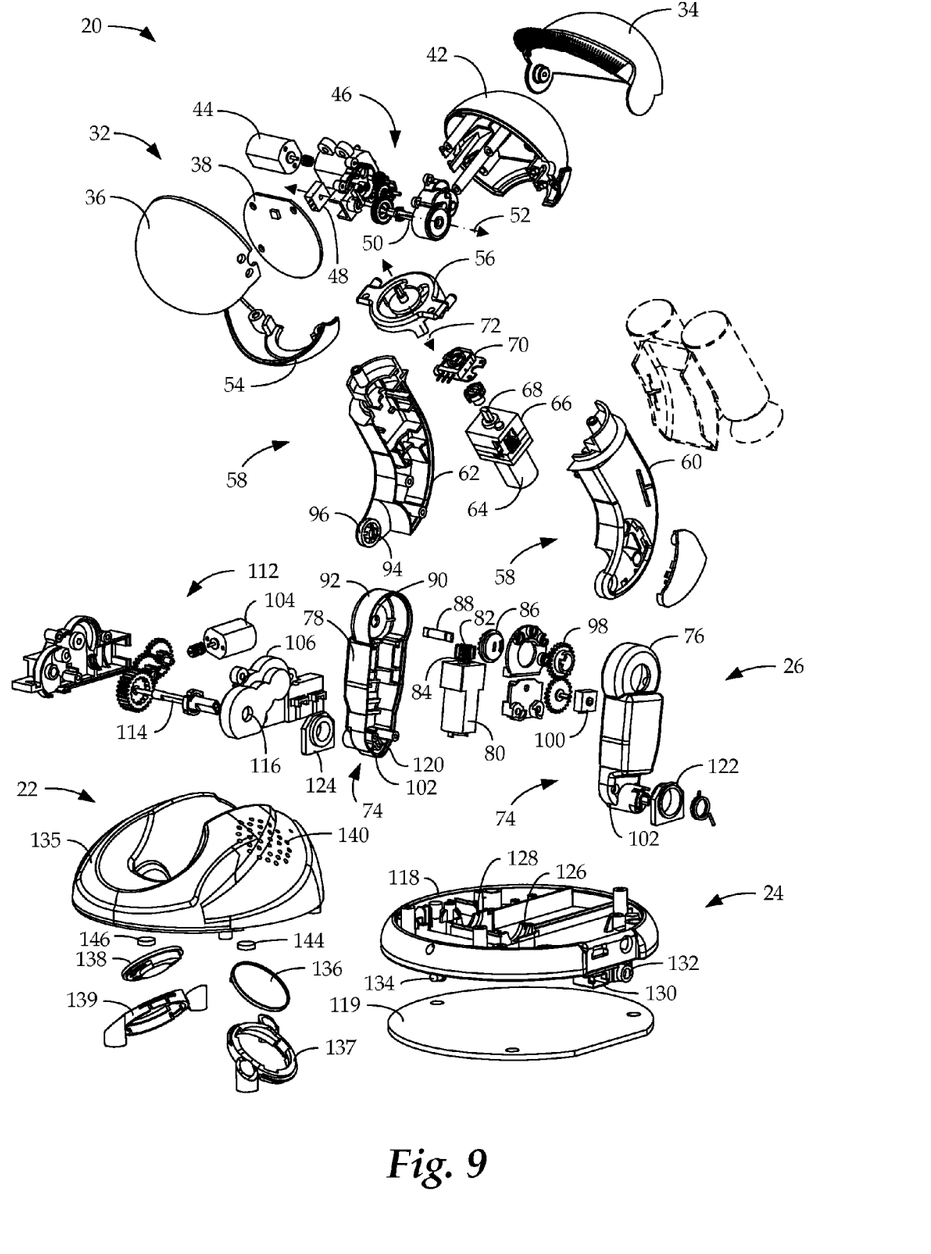
FIG. 9 is an exploded perspective view from right to left of the interactive apparatus of FIG. 1.
Figure 9A:
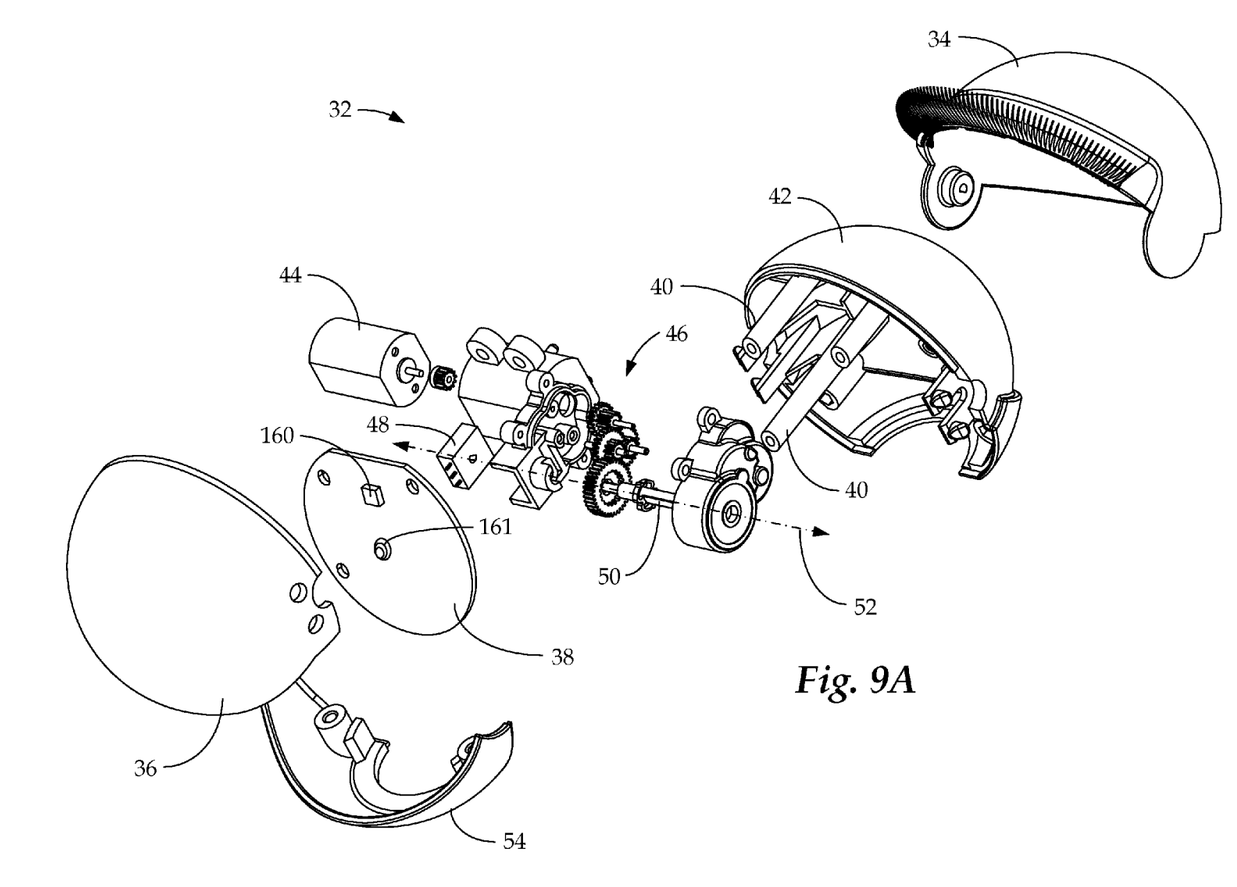
FIG. 9A is an enlarged exploded perspective view of the eye assembly of FIG. 9.

Referring to FIGS. 8 and 9, the eye assembly 32 includes a lens 36 and a lens mounting plate 38 fastened to mounting posts 40 secured to a back or cap 42 of the eye assembly 32. An eyelid drive motor 44 is coupled to eyelid actuation gears 46, which are coupled to the eyelid 34 and mounted to the back of the eye 42. An eyelid position sensor 48 coupled to the eyelid drive shaft 50 measures the rotational position of the eyelid 34 around an eyelid axis of rotation 52. A lower eye cover 54 is fastened to the back of the eye 42 and covers the lower edge of the lens 36. The lower eye cover 54 is fastened to a pivot plate 56, which is rotationally coupled to the body assembly 30, to connect the eye assembly 32 to the body assembly 30.

Figure 9B:
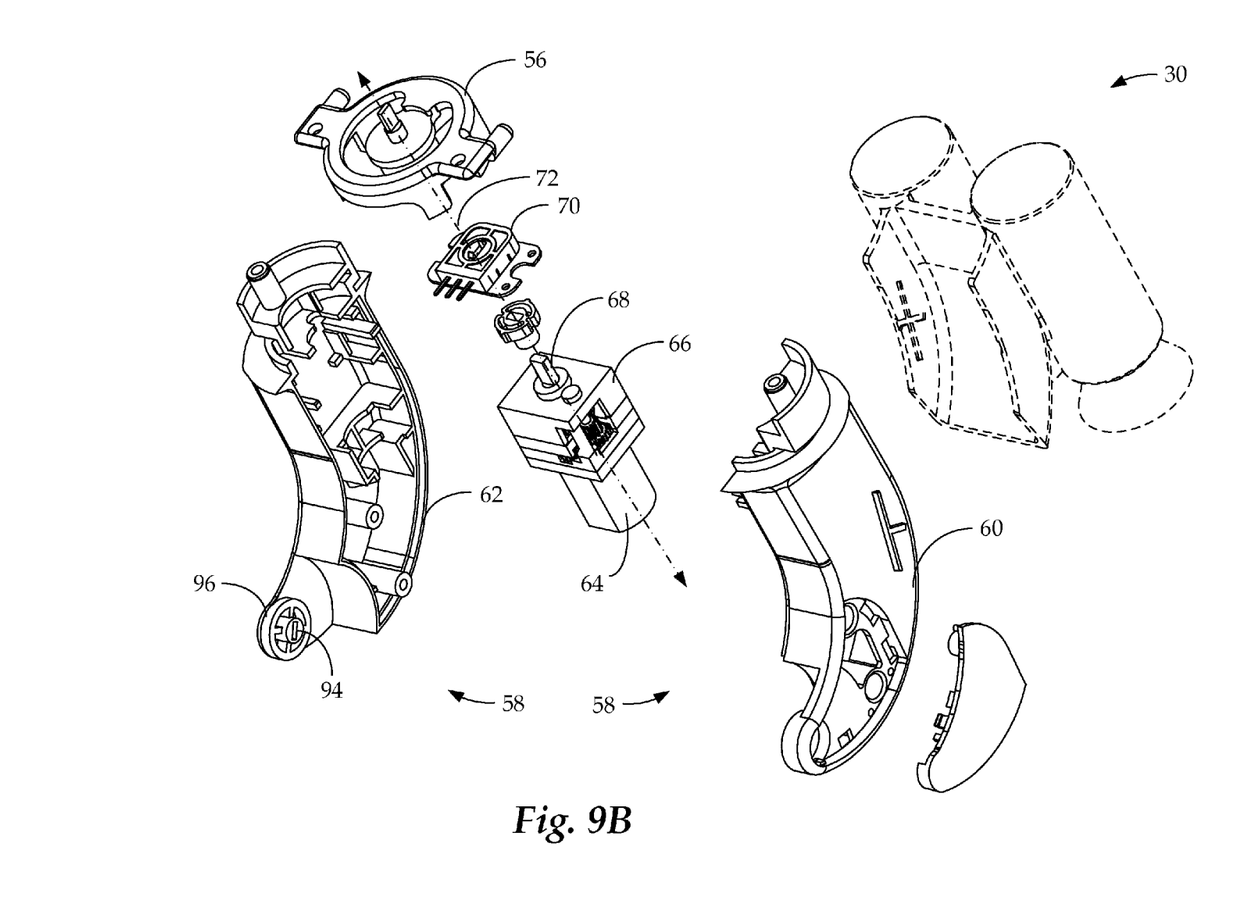
FIG. 9B is an enlarged exploded perspective view of the body assembly of FIG. 9.

The body assembly 30 includes a housing 58 with left 60 and right 62 halves, which are fastened together. An eye assembly drive motor 64 is coupled to an eye assembly gear box 66 and mounted to the left half 60 of the housing 58. An eye assembly drive shaft 68 is coupled to the pivot plate 56 to pivot the eye assembly 32 back and forth. An eye assembly position sensor 70 is also coupled to the eye assembly drive shaft 68 and measures the rotational position of the eye assembly 32 about an axis of rotation 72.

Figure 9C:
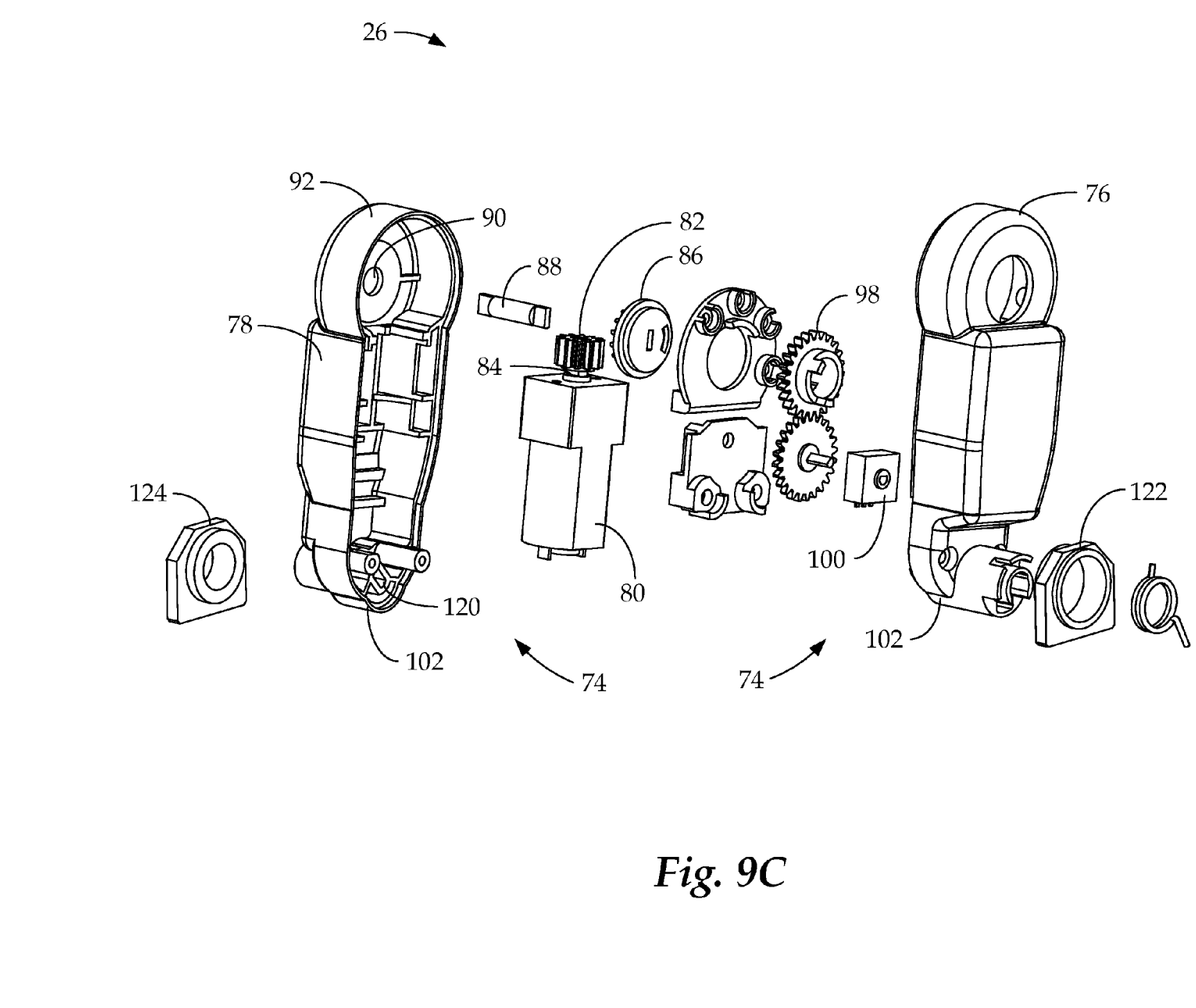
FIG. 9C is an enlarged exploded perspective view of the leg assembly of FIG. 9.

The body assembly 30 is pivotally coupled to the leg assembly 26 at the knee 28. The leg assembly 26 includes a leg housing 74 with left 76 and right 78 halves fastened together. A body assembly drive motor 80 is mounted in the left half 76 of the leg housing 74. A spindle gear 82 coupled to a drive shaft 84 of the body assembly drive motor 80 engages a crown gear 86. A body assembly drive shaft 88 coupled to the crown gear 86 passes through an aperture 90 in an upper end 92 of the right half 78 of the leg assembly housing 74 and engages a slot 94 in a lower end 96 of the right half 62 of the body assembly housing 58.

The crown gear 86 is also coupled to spindle gears 98, which are coupled to a body assembly position sensor 100 and measures the rotational position of the body assembly 30.

Figure 9D:
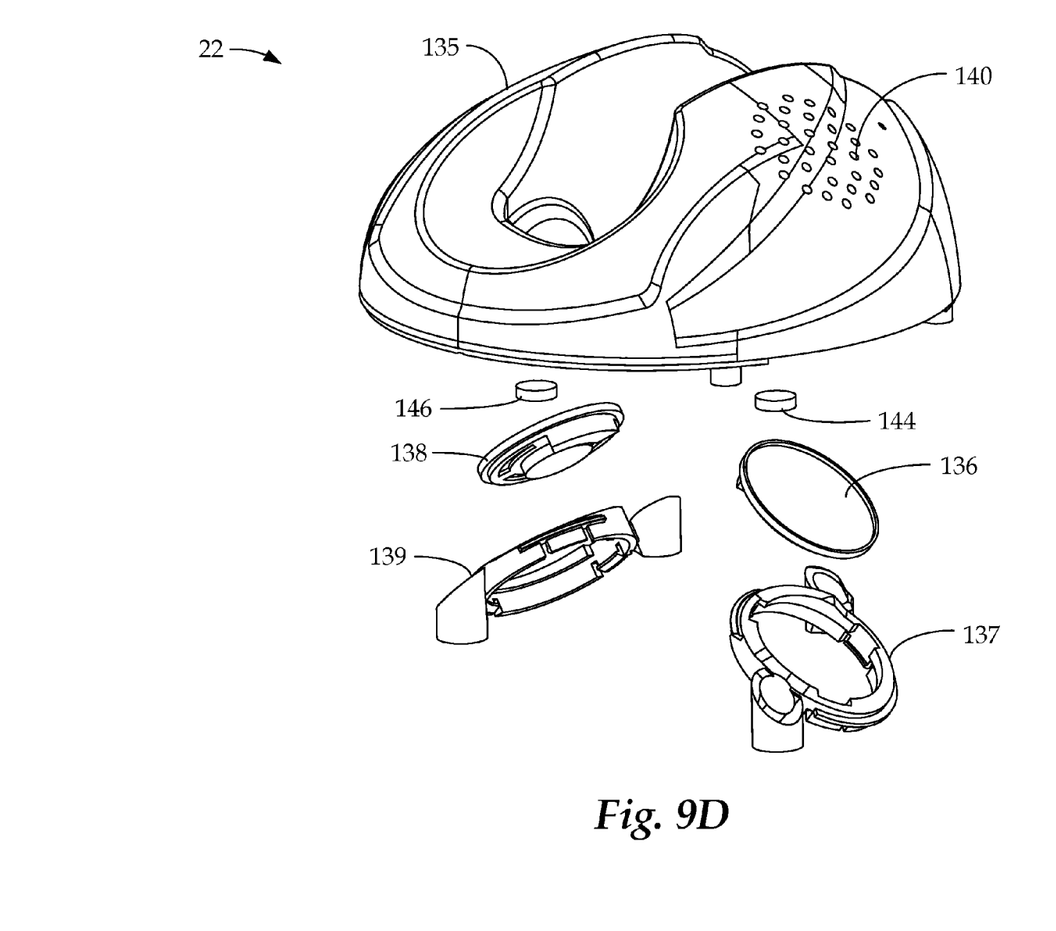
FIG. 9D is an enlarged exploded perspective view of the base assembly of FIG. 9.
Figure 9E:
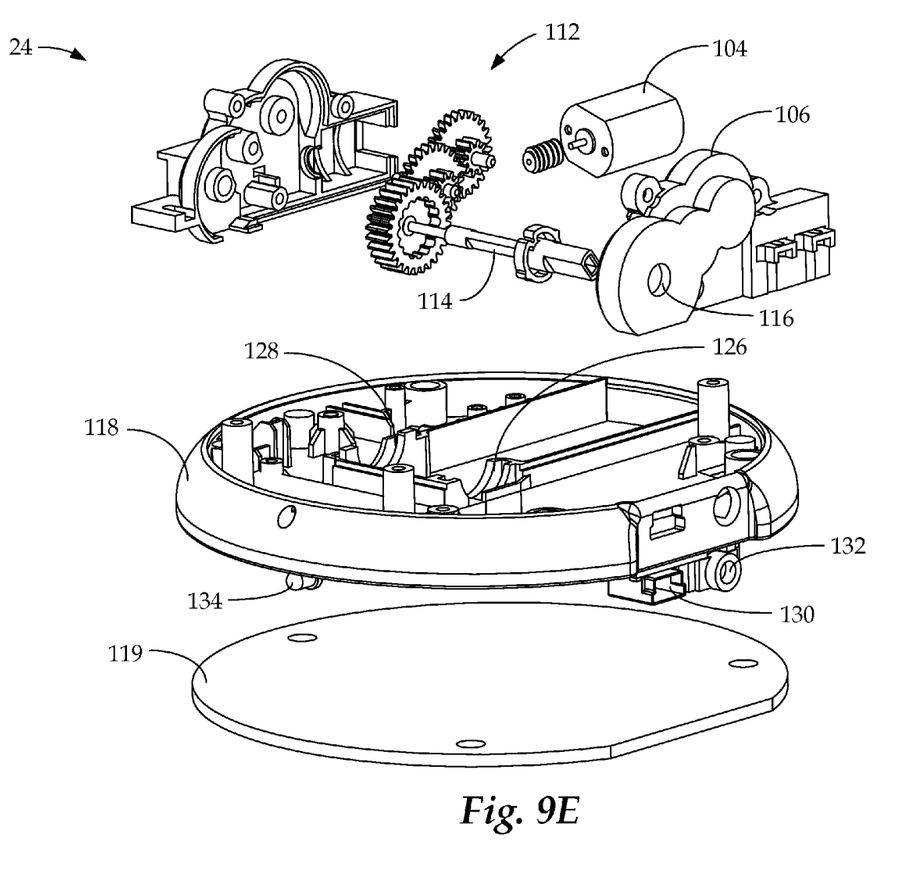
FIG. 9E is an enlarged exploded perspective view of the foot assembly of FIG. 9.

The leg assembly 26 is pivotally coupled to the foot assembly 24 at a lower end 102 of the leg assembly housing 74. A leg assembly drive motor 104 is mounted in a foot gear box 106. A worm gear 108 coupled to a drive shaft 110 of the leg assembly drive motor 104 engages leg assembly drive gears 112, which are coupled to a leg assembly drive shaft 114. The drive shaft 114 passes through an aperture 116 in the foot gear box 106 to engage a slotted aperture 120 in the lower end 102 of the leg assembly 26. The foot gear box 106 is mounted to a foot pad 118. The lower end 102 of the leg assembly 26 is pivotally coupled to the foot pad 118 by left 122 and right 124 bearings, which engage slots 126 and 128, respectively. The foot assembly 24 also includes a USB port 130, a head phone jack 132, and a photo transistor 134. A base plate 119 covers the bottom of the foot pad 118.

The base assembly 22 includes a shell 135, a pair of speakers 136 and 138, speaker mounts 137 and 139 mounted behind speaker grills 140 and 142, respectively. Additionally, left 144 and right 146 microphones are mounted on each side of the base 22.

Figure 10:
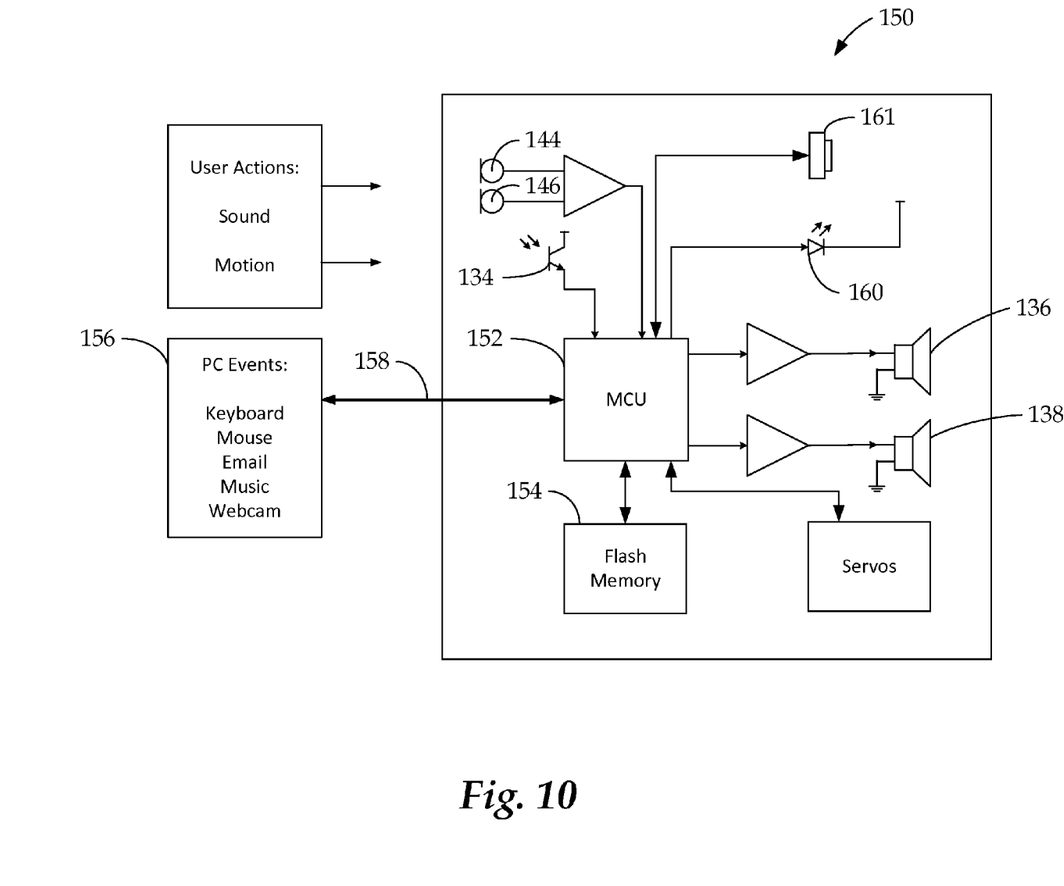
FIG. 10 is a functional block diagram of the control components of the interactive apparatus.

Referring to FIGS. 10 and 8-9, a control circuit, generally indicated by reference numeral 150, is mounted to the foot assembly 24. The control circuit 150 includes a microprocessor control unit ("MCU") 152 and an internal memory 154. The MCU 152 receives power and other inputs from a personal computer 156 connected via a USB cable 158 to the USB port 130. The MCU 152 receives input from the photo transducer 134, microphones 144 and 146, and from the servos 44, 64, 80 and 104, as well as position sensors 48, 70 and 100. Input from the left 144 and right 146 microphones permit the MCU 152 to determine the direction/position of the received sound to actuate the servos in response thereto. Input from the photo transistor 134 permits the MCU 152 to detect movement to wake up the apparatus 20, for example, in response to the presence of a user. A webcam 161 may be mounted to lens mounting plate 38 behind lens 36 and coupled to MCU 152.

The interactive apparatus 20 receives user interactions or PC 156 via the USB port 130. Based on PC outputs or external inputs, the interactive apparatus 20 may perform motion animations as well as audio output and activation of an LED 160 for a visual output. LED 160 may be a single LED or multiple LEDs such as a RGB LED. Activities which may trigger interactive apparatus 20 responses may include mouse cursor movements, keyboard inputs, email events, PC audio output, user movements, activation of a webcam, or voice prompts, for example.

When the PC 156 is shut down, the interactive apparatus 20 may shut down as well. The MCU 152 sends a signal to the eyelid servo 44 to rotate the eyelid 34 to a closed position covering the lens 36. The MCU 152 sends a signal to the body actuator 80 and the leg actuator 104 to rotate forward and back, respectively, to move the interactive apparatus 20 into a folded "resting" or "sleeping" position. When the PC 156 is in a stand by or power save mode, USB power is still available to the MCU 152. The MCU 152 may send signals to the servos to perform "rest" or "daydream" animations, such as a slow turn of the eye 32, movement of the body 30 and leg 26 and slow blink of the eyelid 34, for example. While in a "rest" mode, the interactive apparatus 20 may make responsive animations to a loud sound or movement detected by the photo transistor 134, for example.

When the PC 156 is turned on and power from the USB 158 is applied to the MCU 152, the interactive apparatus 20 may exhibit a wake up animation, such as stretching by extending the body 30 and leg 26, and blinking slowly and widely, by slowly activating the eyelid servo 44 and slowly looking around by actuating the eye assembly servo 64, making an associated "wake up" sound, and activating the LED 160.

When input is detected by the MCU 152 from the USB port 158, the interactive apparatus 20 may exhibit various "companion" mode animations and responses. For example, when an email is received, the interactive apparatus may perform an alert animation such as moving up and down quickly by simultaneously actuating the leg servo 104 and body servo 80.

When certain predefined or programmed words are typed via the keyboard and received by the MCU 152 via the USB port 158, specific animations, activation of the speakers 136 and 138 to output associated sounds, and/or activation of the LED 160 may be performed.

For example, when a user has typed words such as "good," "alive," "native," "social," "lucky," "excellent," "wonderful," "perfect," "right," "correct," "classy" or "elegant," a "good" animation may be played, such as moving the body 30 quickly forward twice.

When the user has typed words such as "bad," "abuse," "hate," "rage," "cheap," "dangerous," "serious," "risky," "hazardous" or "unsafe," a "bad" animation may be played, such as closing the eye 32, and moving the body 30 forward and down to a low position, for example.

When the user has typed words such as "happy," "joyful," "delighted," "merry," "joyous," "glad," and "pleased," a "happy" animation such as moving the body 30 quickly forward and backward, and up and down, may be played.

When the user has typed words such as "sad," "alone," abject," "grief," "hopeless," "sorry," "single," "pity," "poor," "joyless," "woeful," "depressed," "tearful" or "sorrowful," for example, a "sad" animation may be played such as bending the body 30 and leg 26 backward slowly and then bend forward quickly, and repeating one or more times.

When the user has typed a word such as "angry," "rage," "paddy," "mad," "wrathful" or "raging," an "angry" animation such as bending the body 30 and leg 26 backward slowly and then forward quickly, may be played, and repeated one or more times.

When the user has typed a word such as "excited," "heartfelt," "cordial," "heated" or "crazy," an "excited" animation such as turning the eye 32 quickly and then blinking, may be played.

When the user has typed a word "dislike," "hated," "disdain," despised," "loathe" or "scornful," a "dislike" animation by be played such as bending the body 30 backward, opening the eye 32 open slightly and then turning the eye 32 very quickly, for example.

When the user has typed a word such as "liked," "loved," "nuts," "favor" or "enjoy," a "liked" animation may be played such as turning and blinking the eye 32 quickly.

When the user has typed a word such as "sweet," "naughty," "lovely," "cute," "likeable" or "smart," a "sweet" animation may be played such as turning the eye 32 left slowly and then closing the eye 32 very slowly, for example.

When the user has typed a word such as "sure," "obvious," "resolved," "trusty," "yes" or "reliable," a "sure" animation may be played such as moving the body 30 left and upright and then blinking the eye 32 twice slowly, for example.

When the user has typed a word such as "negative" or "passive," a "negative" animation may be played such as bending the body 30 backward, opening the eye 32 slightly and then turning the eye 32 slowly, for example.

When the user has typed a word such as "hungry," a "hungry" animation may be played such as turning the eye 32 left and right slowly and then blinking.

When the user has typed a word such as "eat," an "eat" animation may be played such as half opening the eye 32 and then blinking very slowly, for example.

When the user has typed a word such as "scared," "agape," "horror," "panic," "fearful," "awful," "terrible," "awesome," "terrified" or "gazed," a "scared" animation may be played such as closing the eye 32, moving the leg 26 and body 30 to a low position.

When the user has typed a word such as "laugh" or "absurd," a "laugh" animation may be played such as moving the body 30 forward and backward in small increments of movement, for example.

When the user has typed a word such as "cry," "afraid," "shout" or "yell," a "cry" animation may be played such as bending the body 30 forward, turning the eye 32 left and right and then half opening the eye 32.

When the user has typed a word such as "alert," "suspicious," "doubted" or "puzzled," an "alert" animation may be played such as turning the eye left and right quickly and then stopping at the left side, for example.

When the user has typed a word such as "sick," "old," "lousy," "diseased" or "unsound," a "sick" animation may be played such as turning the eye 32 left and right very quickly and then opening the eye 32 slightly, for example.

When the user has typed a word such as "nasty," "messy" or "rude," a "nasty" animation may be played such as closing the eye 32 and then turning the eye 32 left and right very quickly, for example.

When user has typed a word such as "easy," "pure," "relaxed," "refined," "cozy," "easeful," "comfortable" or "homelike," an "easy" animation may be played such as bending the body 30 backward and then closing the eye 32 slowly.

When the user has typed a word such as "curious" or "question," a "curious" animation may be played such as turning the eye 32 to the left, to the right and then back to the center again.

When the user has typed a word such as "kind," "nice," "affable," "merciful," "friendly," "softhearted," "brotherly" or "genial," a "kind" animation may be played such as bending the body backward, and turning the eye 32 left and right and then blinking, for example.

When the user has typed a word such as "sexy" or "fair," a "sexy" animation may be played such as turning the eye 32 right or left and then blinking, for example.

When the user has typed a word such as "manly," a "manly" animation may be played such as turning the eye 32 left and right slowly and then return to the center position very quickly, for example.

When the user has typed a word such as "shy" or "ashamed," a "shy" animation may be played such bending the body 30 and leg 26 forward completely, and blinking the eye 32 slowly.

When the user has typed a word such as "dog," a dog-like animation may be played such as bending the body 30 and leg 26 backward and then bending the body 30 forward and backward in sync with a dog sound generated by the MCU 152 and output on speakers 136 and 138.

When the user has typed a word such as "pig," a pig-like animation may be played such as bending the body 30 and leg 26 backward, and closing the eye 32 slowly, and then bending the body 30 forward and backward in sync with a pig sound generated by the MCU 152 and output on speakers 136 and 138.

When the user has typed a word such as "cat," a cat-like animation may be played such as bending the body 30 and leg 26 backward, then bending the body 30 forward slightly, and then turning the eye 32 left and right, for example.

When a web cam is being used, the MCU 152 will actuate the eye assembly servo 64 to turn to the direction of the speaker's voice using input from the microphones 144 and 146, for example.

When music is detected by the MCU 152, the MCU 152 will actuate servos 44, 66, 80 and 104 to perform a dancing animation in sync with the beat of the music, for example. Other sound input from the microphones 144 and 146 as detected by the MCU 152 may produce additional animations. One animation is body and leg upright, eye closed slowly and then head rotate. Another animation is body and leg upright, eye closed slowly and then head rotate so as body bend forward for two times.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is as follows:

1. A robotic apparatus comprising:
    an interactive figure having a base assembly, a foot assembly coupled to said base assembly, a leg extending upwardly from said base assembly and pivotally coupled to said base assembly, a knee coupled to said leg, a body assembly pivotally coupled to said leg at said knee, and an eye assembly on an upper end of said body assembly rotationally coupled with the body assembly for movement about a laterally-extending rotational axis,
    said eye assembly having a movable eyelid and an eyelid drive motor coupled to said eyelid for moving the eyelid to a desired position,
    an eye assembly drive motor coupled to said eye assembly to selectively rotate said eye assembly about an axis,
    a leg assembly drive motor coupled to said leg to selectively pivot said leg,
    a body assembly drive motor coupled to said body assembly to selectively pivot said body about said knee,
    a position sensor for measuring the rotational position of said eyelid about said axis in response to sensed conditions,
    first and second microphones mounted on opposite sides of said base assembly,
    a photo transistor mounted on a front side of said base assembly, and
    a microprocessor control unit coupled to a personal computer to receive commands therefrom and coupled to said drive motor to operate said drive motor in response to commands received from said personal computer,
    said microprocessor responsive to input from said first and second microphones to determine a direction of a sound received by said first and second microphones to operate said drive motor to turn said eye assembly in said direction of said received sound,
    said microprocessor control unit responsive to input from said photo transistor to detect movement in front of said base assembly to operate said leg assembly drive motor and said body assembly drive motor to pivot said leg assembly and body assembly about said knee.

2. The robotic apparatus of claim 1 further comprising an eye assembly drive motor coupled to said eye assembly and responsive to commands received from said microprocessor control unit to pivot said eye assembly back and forth.

3. The robotic apparatus of claim 1 further comprising a body assembly drive motor coupled to said body assembly and said knee and responsive to commands received from said microprocessor control unit to pivot said body assembly about a longitudinal axis running through said knee.

4. The robotic apparatus of claim 1 further comprising a leg assembly drive motor coupled to said leg assembly and said foot assembly and responsive to commands received from said microprocessor control unit to pivot said leg assembly about a longitudinal axis running through said foot assembly.

* * * * *